United States Patent
Johansson et al.

(10) Patent No.: US 8,194,533 B2
(45) Date of Patent: Jun. 5, 2012

(54) FAULT TOLERANT DATA BUS NODE AND SYSTEM

(75) Inventors: Rikard Johansson, Linköping (SE); Kjell Wistedt, Linköping (SE)

(73) Assignee: SAAB AB, Linköping (SE)

( * ) Notice: Subject to any disclaimer, the term of this patent is extended or adjusted under 35 U.S.C. 154(b) by 1074 days.

(21) Appl. No.: 11/798,767

(22) Filed: May 16, 2007

(65) Prior Publication Data

US 2007/0268819 A1  Nov. 22, 2007

(30) Foreign Application Priority Data

May 16, 2006  (EP) .................................... 06114053

(51) Int. Cl.
*H04J 3/14*  (2006.01)
(52) U.S. Cl. ......... 370/216; 370/242; 370/442; 710/107
(58) Field of Classification Search .................. 370/216, 370/257, 437–440, 362–364; 709/225; 710/36, 710/100, 124, 25
See application file for complete search history.

(56) References Cited

U.S. PATENT DOCUMENTS

| | | | | | |
|---|---|---|---|---|---|
| 4,398,287 | A | * | 8/1983 | Spencer | 370/362 |
| 4,791,629 | A | * | 12/1988 | Burns et al. | 370/363 |
| 5,249,218 | A | * | 9/1993 | Sainton | 455/418 |
| 5,463,624 | A | * | 10/1995 | Hogg et al. | 370/461 |
| 5,564,025 | A | * | 10/1996 | De Freese et al. | 710/110 |
| 5,809,021 | A | * | 9/1998 | Diaz et al. | 370/364 |
| 6,141,349 | A | * | 10/2000 | Ikeda et al. | 370/405 |
| 6,434,691 | B2 | * | 8/2002 | Murakami et al. | 712/205 |
| 6,721,559 | B1 | * | 4/2004 | Kocin et al. | 455/431 |
| 7,246,186 | B2 | * | 7/2007 | Hall et al. | 710/124 |
| 7,406,555 | B2 | * | 7/2008 | Juelfs et al. | 710/124 |
| 7,483,778 | B2 | | 1/2009 | Armbruster et al. | |
| 2002/0194548 | A1 | | 12/2002 | Tetreault | |

(Continued)

FOREIGN PATENT DOCUMENTS

| | | |
|---|---|---|
| WO | WO-88/08161 A1 | 10/1988 |
| WO | WO-03/069843 A2 | 8/2003 |
| WO | WO-2004/029737 A1 | 4/2004 |

OTHER PUBLICATIONS

European Search Report issued in connection with counterpart European Patent Application No. 06 114 053.9, dated Nov. 20, 2006.

(Continued)

*Primary Examiner* — Hassan Kizou
*Assistant Examiner* — Roberta A Shand
(74) *Attorney, Agent, or Firm* — Venable LLP; Eric J. Franklin

(57) ABSTRACT

A data bus node, being a control node or a sensor node and being arranged to communicate over a TDMA data bus. The node includes a time signal processing device being configured to define a TDMA time slot transmission schedule for at least the node. A switch is configured to either connect or isolate a transmission path of the node to the bus and is configured to be controlled by the TDMA time slot transmission schedule for the node via a bus transmission access control device. The bus transmission access control device is configured to be further controlled by at least one external control signal via at least one external data transmission link being physically separated from the bus. A fault tolerant data bus system includes such a bus node and an aircraft exploiting the node/system. The babbling idiot problem is solved and at the same time the node/s/system fail silent behavior is enhanced.

17 Claims, 2 Drawing Sheets

U.S. PATENT DOCUMENTS

| | | | | |
|---|---|---|---|---|
| 2004/0003145 | A1* | 1/2004 | Schneiderman et al. | 710/25 |
| 2005/0094674 | A1* | 5/2005 | Zinke et al. | 370/507 |
| 2007/0036095 | A1* | 2/2007 | Fuhrmann et al. | 370/282 |
| 2007/0185687 | A1* | 8/2007 | Speasl et al. | 702/185 |
| 2009/0262649 | A1* | 10/2009 | Zinke et al. | 370/242 |
| 2010/0229046 | A1* | 9/2010 | Fuehrer et al. | 714/43 |

OTHER PUBLICATIONS

Communication Pursuant to Article 94(3) EPC from the European Patent Office, dated Feb. 2, 2012, issued in connection with counterpart European Patent Application No. 06 114 053.9.

Forsberg et al.; Maintaining Consistency Among Distributed Control Nodes; IEEE; Oct. 24, 2004; pp. 6D2-1-6.D2-12.

Kopetz et al.; Tolerating Transient Faults in MARS; IEEE; Jun. 26, 1990; pp. 466-473.

C. Temple; Avoiding the Babbling-Idiot Failure in a Time-Triggered Communication System; IEEE; Jun. 23, 1998; pp. 218-227.

Kristina Ahlstrom et al.; Redundancy Management in Distributed Flight Control Systems: Experience & Simulations; 2002 IEEE; pp. 13.C3-1 to 13.C.3-7, December.

I. Broster, et al.; "An Analysable Bus-Guardian for Event-Triggered Communication"; 2003 IEEE; pp. 1-10, December.

H. Kopetz; "Fault Containment and Error Detection in TTP/C and FlexRay"; Aug. 28, 2002; p. 1-21.

* cited by examiner

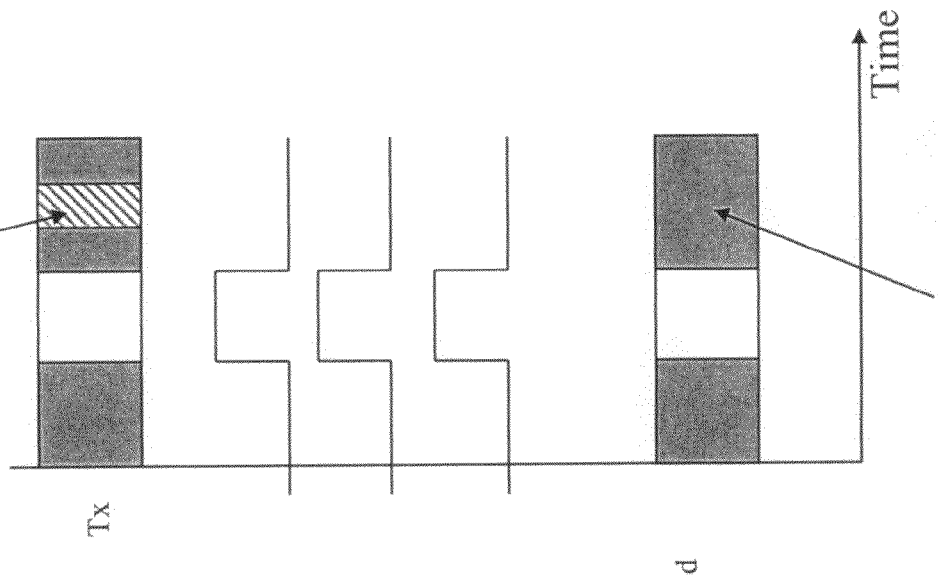

FAULT TOLERANT DATA BUS NODE AND SYSTEM

CROSS-REFERENCE TO RELATED APPLICATION

This application claims priority to European patent application number 06114053.9 filed 16 May 2006.

TECHNICAL FIELD OF THE INVENTION

The invention relates generally to fault tolerant data systems.

BACKGROUND

Fault tolerant data (control) systems are used e.g. for aviation applications requiring very high integrity. Conventional fault tolerant aviation control systems are based on point-to-point communication between computer/s, sensor/s and actuator/s.

Problems associated with conventional aviation fault tolerant control systems relate to weight, complexity, data processing availability and cost.

The article "REDUNDANCY MANAGEMENT IN DISTRIBUTED FLIGHT CONTROL SYSTEMS: EXPERIENCE AND SIMULATIONS", by K. Ahlstrom et. al, published by IEEE 2002, describes a fault tolerant real time control system for aviation applications which comprises control nodes designed with high degree of embedded fault detection. A simulation of the system is based on the assumption that all nodes send data (to the bus) strictly in their timeslots due to the fact that a bus guard in each node protects the bus from "babbling idiot" faults. A drawback with this design is that nodes actually functioning correctly may be blocked to transmit to the bus because of a malfunctioning bus guard.

The article "An Analysable Bus-Guardian for Event-Triggered Communication" by I. Brooster & A. Burns, published by IEEE, 24:th IEEE International Real-Time Systems Symposium, describes various bus-guardian strategies/architectures. One such strategy/architecture has a guardian as a completely separate node connected directly to a (TDMA) bus. Using only information from the bus, the guardian node monitors transmissions on the bus and detects babbling nodes. The guardian node is arranged to affect (shut down) a babbling node using a direct link to the babbling node. A problem with this strategy/architecture is that the guardian is only able to detect a babbling node after it has transmitted an incorrect message onto the bus.

A general problem with fault tolerant TDMA bus data systems is the babbling idiot problem, i.e. that a node transmits on the bus in a time slot not being dedicated to that node.

SUMMARY OF THE INVENTION

It is an object of the present invention to provide methods and means which solves/mitigates the problems discussed above.

It is an object of the present invention to provide a fault tolerant data system comprising a set of data processing control nodes being arranged to communicate over a TDMA-bus wherein a plurality of said nodes each comprise a bus guardian mechanism to suppress a faulty transmission behavior of the respective node, which data system effectively solves the babbling idiot problem discussed above and which system exhibits an enhanced overall fail silent behavior, without compromising the weight/availability characteristics of the system.

According to a first aspect, the invention provides a data bus node, being a control node or a sensor node and being arranged to communicate over a TDMA data bus, the node comprising:

a time signal processing device being configured to define a TDMA time slot transmission schedule for at least said node, a switch being configured to either connect or isolate a transmission path of said node to the bus and configured to be controlled by said TDMA time slot transmission schedule for said node via a bus transmission access control device, said node being characterised in that said bus transmission access control device is being configured to be further controlled by at least one external control signal via at least one external data transmission link being physically separated from said bus.

The invention eliminates in this way the need of double clocks, i.e. double TDMA schedules, in the node, for obtaining faulty transmission suppression. Instead, the node may exploit e.g. pre-programmed TDMA schedules and/or other control signals of other nodes via the external communication link in order to suppress its faulty transmission behavior, i.e. suppress a babbling idiot behavior and/or enhance a fail silent behavior. Since the communication link is physically separated from the bus, a babbling idiot behavior may be blocked immediately so that "faulty" transmissions are blocked from ever being transmitted onto the bus. Furthermore, the overall data availability and the effective bandwidth of the bus are not compromised in any way.

The node may comprise a logical device being configured to:

receive and process at least two input control signals from a plurality of nodes associated with the bus via said external data transmission link/s, and issue a control signal, being a function of said received at least two input control signals, to the bus transmission access control device.

Allows for effective "electronic parliament" decisions, i.e. intelligent decision based on diversity, for the bus transmission access control device.

The bus transmission access control device may being realised as a voter and said logical device may be realised as a voter.

Provides for a simple, cost effective realisation.

The node may further comprise a watchdog monitoring device for establishing whether the node itself is malfunctioning or not and said bus transmission access control device may be configured to be further controlled by the watchdog monitor device.

Allows for further enhanced fail silent behavior of the node since any malfunctioning of the node as identified by the watchdog monitor device may block further transmissions onto the bus.

The node may further comprise a power supply ok device for establishing whether the node itself is being powered in an accurate way and wherein said bus transmission access control device is configured to be further controlled by the power supply ok device.

Allows for further enhanced fail silent behavior of the node since any incorrect powering of the node as identified by the power supply ok device may block further transmissions onto the bus.

The TDMA time slot transmission schedule may further define transmission slots for at least one other node associated with the bus, and the node itself may be arranged to:

form an output control signal being a function of said TDMA time slot transmission schedule, and to output said control signal to at least one other node over an external data transmission link being physically separated from said bus.

Allows for the creation of effective clusters of nodes in which each node comprises a time signal processing device configured to define a TDMA time slot transmission schedule for all cluster nodes and in which the cluster nodes exploit each others TDMA schedule for effective faulty transmission suppression. More specifically, a babbling idiot behavior of a node associated with the bus may effectively be suppressed in this way.

The node may further comprise a monitoring device for monitoring control signals transmitted over the bus by other control nodes or sensor data transmitted over the bus by sensor nodes associated with the bus, and the monitoring device may be arranged to:

establish a malfunctioning state of a malfunctioning node associated with the bus, based on said monitoring, and, issue a transmission block control signal for blocking further transmissions of the malfunctioning node in response to the thus established malfunctioning state of the malfunctioning node, and wherein the node itself further may be configured to form said output control signal/s as a function of said transmission block control signal.

This provides for effective inter node control further enhancing the fail silent behavior of the node/s. Furthermore, since this monitoring device advantageously is being realised by means of software, the invention provides a flexible solution making it easy to update/configure/adapt a bus data system, e.g. at a late stage during the system design work, without compromising the overall integrity/complexity/weight of the system.

The node may comprise a watchdog monitoring device for establishing whether the node itself is malfunctioning or not and wherein the node is configured to form said output control signal as a function of a watchdog monitor output control signal issued by said watchdog monitoring device and indicative of whether the node is malfunctioning or not.

Effectively blocks this nodes influence on other nodes' bus transmissions on the bus in case this node itself is malfunctioning.

The node may further comprise a power supply ok device for establishing whether the node itself is being powered in an accurate way and wherein the node is configured to form said output control signal as a function of a control signal from said power supply ok device.

Effectively blocks this nodes influence on other nodes' bus transmissions on the bus in case the power supply of this node itself is malfunctioning.

According to a second aspect, the invention provides a fault tolerant data bus system comprising at least two bus nodes, being control- or sensor nodes and being arranged to communicate over a TDMA-bus, wherein a plurality of said nodes each comprise a bus guardian mechanism to suppress a faulty transmission behavior, wherein the system comprises a node according to the first aspect of the invention.

Provides a fault tolerant data bus system which in a simple manner may be updated to a (babbling idiot)/(fail silent) safe data bus system with increased integrity. All that is needed is to install a second node and connect it, via a data transmission link being physically separated from the bus, with the existing first node.

The fault tolerant data bus system may be configured so that at least two of said nodes are connected via at least one data transmission link being physically separated from said bus, thereby allowing at least one bus guardian mechanism of one of the thus connected nodes to issue a control signal to the bus guardian mechanism of another one of the thus connected nodes over said transmission link.

Since the bus guardian mechanisms of individual nodes according to the invention in this way may communicate, and therefore control/block each other, over the communication link being physically separated from the bus, they may also enhance their respective fail silent behavior by means of mutual faulty transmission suppression. More specifically, the invention allows in this way for the immediate blocking of faulty "babble" transmissions, i.e. "transmissions" from one (malfunctioning) control node outside its dedicated time slot are effectively being blocked from being transmitted onto the bus. Also, in this way each node may obtain faulty transmission suppression diversity by exploiting the clock/s and transmission schedule/s of other nodes, i.e. only one clock and bus transmission schedule need to be implemented in each node, which directly translates into a decreased system weight. Furthermore, since the invention eliminates the need for a specific pure bus guardian node for monitoring/blocking the control nodes, the invention provides for increased system safety and decreased complexity/cost/system-weight at the same time.

The fault tolerant data bus system may be configured so that at least three of said nodes are mutually interconnected with each other via data transmission links being physically separated from said bus, thereby creating a cluster of at least three nodes mutually controlling each others bus guardian mechanism via said data transmission links.

Provides a possibility to obtain effective bus transmission decisions with a decision diversity of at least 3 independent units. This means that the probability that a malfunctioning node actually influences/controls a well functioning node is drastically reduced, which directly translates into an increased system integrity.

The fault tolerant data bus system may comprise a control node being connected with a sensor via an analogous interface being separated from the data bus and wherein the control node is being arranged to read sample values from the sensor over said analogous interface.

This solution may be advantageous in environments/applications where a sensor node is distant from, and not necessarily need to communicate over the bus with, other control nodes but need to communicate with at least one control node. In this way, the sensor node as such need no babbling idiot protection, which decreases complexity/cost.

The fault tolerant data bus system may be realised so that said external data transmission link/s being physically separated from the bus is realised as:

an electrical circuit, e.g. in form of a cable, wire, fiber optics or a lead line made of an electrically conducting material, a radio communication link, e.g. a wireless Bluetooth™ link, an infrared communication link, a sonar data transmission link, or combinations thereof.

Allows for good node functionality in a wide range of environments/applications, such as under water applications etc.

According to a third aspect, the invention provides an aircraft comprising a data bus node according to the first aspect of the invention, or a fault tolerant data system according to the second aspect of the invention.

Provides for an aircraft having a data system with increased integrity and decreased weight.

BRIEF DESCRIPTION OF THE DRAWINGS

The features and advantages of the present invention will become more apparent from the following detailed description of the preferred embodiments with reference to the accompanying drawings, wherein FIG. 2 illustrates how a babbling idiot behavior of a node is effectively being suppressed according to the invention.

DETAILED DESCRIPTION OF PREFERRED EMBODIMENTS

Figure 1:
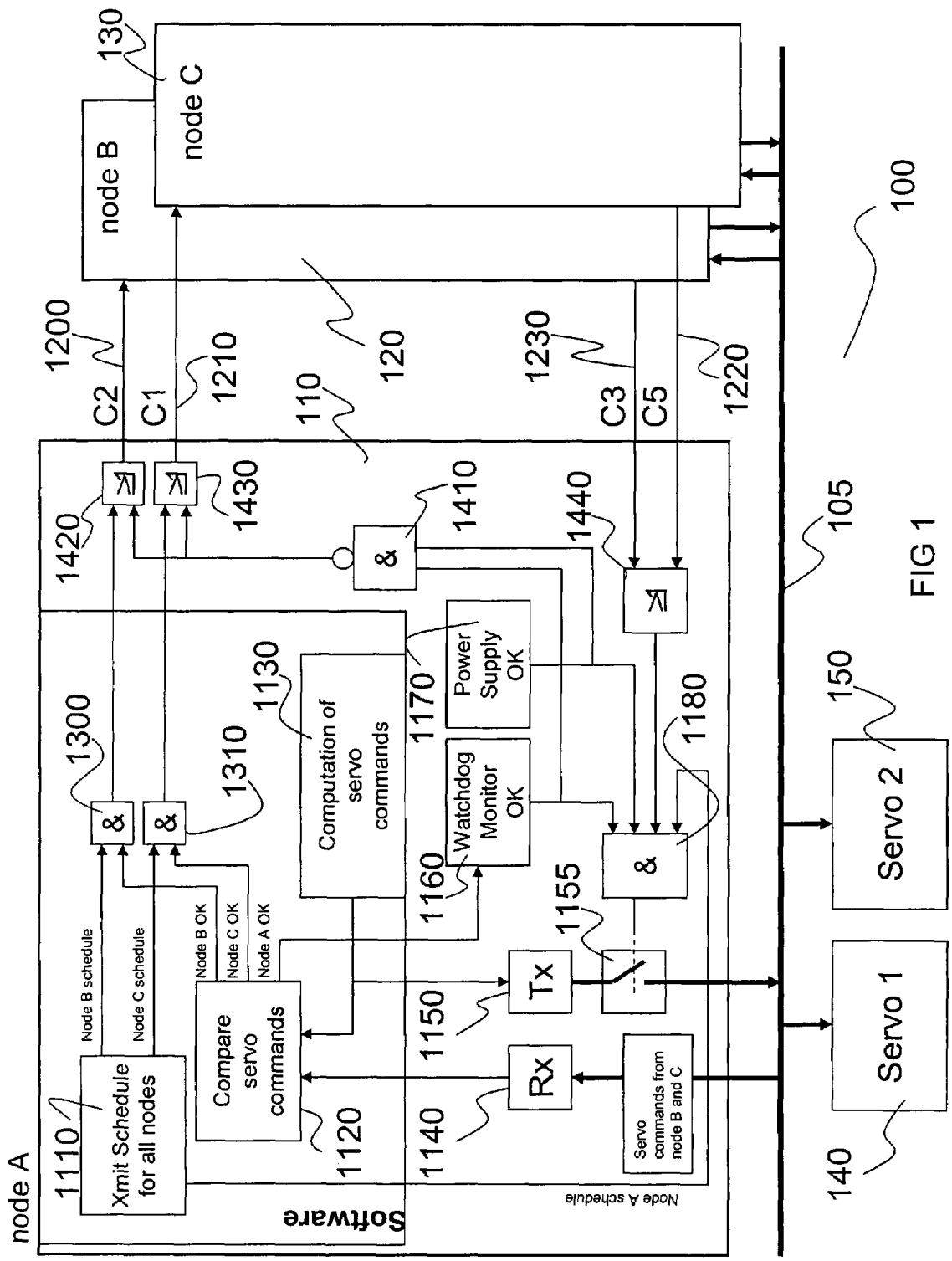
FIG. 1 shows an illustrative example of a fault tolerant data system 100 according to an embodiment of the invention.

Now, with reference to FIG. 1-2, the present invention will be described in more detail.

The invention will here be described in detail for the specific embodiment wherein the fault tolerant data system is realised as a distributed flight control system, but it is evident for a person skilled in the art that the fault tolerant data system according to the invention may be used for many other applications exploiting data processing nodes communicating over a TDMA data bus.

Terminology:

Control node: A data processing node connected to a data bus and which processes relevant control information data to issue control signals to actuators (actuator nodes) on the bus.

Fail silent control node: A control node which exhibits only a single, fail silent, failure mode is referred to as a fail silent control node. In general a control node is considered to be fail silent if it produces either correct results or no results at all. Fail silent behavior assures that an error within one control node cannot propagate to other control nodes within the system so that each node can be regarded as a separate fault containment region.

Actuator node: A node comprising an actuator for regulating a device, e.g. for regulating a control surface of a wing in an airplane, and arranged to regulate said device in accordance with received control, signals from the control nodes.

Sensor node: A node comprising some measurement device for establishing a physical entity value, such as the angular position of a control surface of a wing in an airplane, and arranged to communicate the established physical entity value to at least one control node over the bus.

Servo node: An actuator node being integrated with a sensor node. Thus, a servo node should be interpreted to be also a sensor node according to the invention.

Bus guard nodes: Nodes arranged to simply monitor, and possibly block transmission of (malfunctioning) control nodes, are referred to as bus guard nodes. Thus, these nodes do not transmit any control signals on the bus to actuator nodes.

FIG. 1 illustrates schematically an illustrative example of a fault tolerant data bus system 100 according to the invention, in form of a distributed flight control system installed in an airplane (not illustrated). The system 100 comprises a set of fail silent control nodes 110, 120, 130, connected to a TDMA-bus 105. Servo nodes 140, 150 are also connected to the bus 105. The servo nodes 140, 150 in this illustrative example may e.g. regulate a respective control surface of a respective wing of the airplane.

The control node 110, here also referred to as node A, comprises a software block 1100 which for the sake of clarity has been divided into a TDMA transmit schedule device 1110, a conventional compare servo command device 1120 and a conventional computation of servo command device 1130. The software block is normally realised by means on software in form of program code means being executed by a data processing device, such as a microcomputer or CPU (not illustrated). According to the invention, the conventional compare servo command device 1120 is along with a transmit schedule device 1110 arranged to form control commands C1 and C2 to other nodes. In practice, the transmit schedule device 1110, the compare servo command device 1120 and the computation of servo command device 1130 are normally realised as software running on a data processing unit, such as a CPU, not illustrated in FIG. 1. The transmit schedule device 1110 has according to the invention a transmit schedule stored defining the transmission slots at least for node A and preferably also for other control nodes, e.g. node B 120. Preferably, the transmit schedule stored in the transmit schedule device 1110 defines the TDMA transmission time slots for all of control nodes 110, 120, 130 and possibly also for the servo nodes 140, 150, but many possibilities exist. The transmit schedule device 1110 comprises a conventional synchronized time base, i.e. a clock, not illustrated, for the precise definition of transmission schedule of the nodes 110, 120, 130, 140, 150, i.e. the node specific TDMA time slots. The node A 110 comprises a conventional transceiver device, illustrated by receiver device 1140 and transmitter device 1150 in FIG. 1, connected to the bus 105. The watchdog monitor device 1160 may be a conventional watchdog monitor device 1160 which normally is realized by means of a hardware detector circuit continuously reading pulses from the CPU, and may be arranged to issue a logical "0" signal if it detects that the node A 110, i.e. its CPU, is malfunctioning, for any reason, and to issue a logical "1" signal otherwise. Many possibilities exist, the watchdog 1160 may optionally be fed and controlled also by the monitoring device, the compare servo command device, 1120, as illustrated in FIG. 1. The output of watchdog monitor device 1160 is, according to the invention, connected to the input of an "electronic parliament" circuit 1180, here referred to as bus transmission access control device 1180 which here is implemented as an AND-gate. Such an electronic parliament circuit, i.e. a circuit capable of taking decisions and issuing output control signal/s accordingly is conventionally referred to as a voter. The watchdog monitor device 1160 further controls, according to the invention, output control signals C1 and C2, as illustrated in FIG. 1. As illustrated in FIG. 1, the circuit 1180 is also fed by a "power supply ok" device 1170 which may be realized by means of any conventional power guard circuit capable of outputting a "low" (or "False") signal as soon as the node 110 is not being powered properly and outputting a "high" signal otherwise. The AND-gate 1180 controls the transmission of node A 110 onto the bus 105 by controlling a switch which either connects the transmission path of the node A 110 to the bus 105 or isolates it from the bus, as illustrated in FIG. 1. According to the invention, the nodes 110, 120 and 130 are physically connected with each other by at least one communication link, e.g. a lead circuit, 1200, 1210, 1220, 1230, being physically separated from the data bus. These external data transmission link/s 1200, 1210, 1220, 1230 being physically separated from the bus 105 may be realised by means of an electrical circuit, e.g. in form of a cable, wire, optical fibre, or a lead line made of an electrically conducting material, a radio communication link, e.g. a wireless Bluetooth™ link, an infrared communication link, a sonar data transmission link, or suitable combinations thereof depending on environment/application. In the embodiment illustrated in FIG. 1, output signals from the transmit schedule device 1110, along with output signals from the compare servo command device 1120 are gated through AND-gates 1300 and 1310, respectively. The output signal from the watchdog monitor device 1160 is gated along with the output signal from the power supply OK device 1170 through a NAND-gate 1410. The output signal from the NAND-gate 1410 is gated, along with the output signal from AND-gate 1300 and output signal from AND-gate 1310, respectively, through respective OR-gates 1420 and 1430, as illustrated in FIG. 1. The OR gates 1420 and 1430 are connected to a respective corresponding bus transmission access control device (not illustrated) of node B 120 and node C 130, via similar OR gates (not illustrated). The purpose of this is that a malfunctioning node not shall affect/influence the transmissions of well functioning nodes.

In a similar manner, the corresponding bus transmission access control device 1180 of node A 110 is according to the invention fed by control signals C3 and C5 signals from node B 120 and node C 130, via an OR gate 1440, as illustrated in FIG. 1. Thus, the design of node A 110, node B 120 and node C 130, is basically the same in this illustrative example. Each node may implement the software functionality by means of similar software in order to obtain integrity diversity regarding systematical faults, in a conventional manner. Thus, the transmit schedule device 1110, the watchdog monitor device 1160, the computation of servo command device 1130 and the compare servo command device 1120 of node A 110 together form a bus guardian mechanism which suppress a faulty transmission behaviour of node A 110. In a similar manner, control node B 120 and control node C 130 have corresponding bus guardian mechanisms. It should be stressed that the bus guardian mechanism according to the invention, in contrast with conventional bus guards, not only suppresses babbling idiot behaviour of a node/bus-system but also enhances the fail silent behaviour of the node/bus-system. This bus guardian mechanism is according to the invention arranged to receive, and be controlled by, external incoming control signals C3 and C5, and to form and issue output control signals C1 and C2 to other node/s.

Now, with reference to FIG. 1-2 and table 1 below, illustrating an example of data transmissions on the bus (105) during use, the functionality of the fault tolerant data system 100 according to the invention shall be described in more detail.

Control node A 110 is arranged to issue two control signals, C1 and C2 in table 1 and FIG. 1, indicative of whether node A 110 allows node B 120 and/or node C to transmit data on the bus 105. In a similar manner, node B 120 and node C 130 are arranged to issue control signals C3 and C5, respectively, to node A 110. As is illustrated in FIG. 1, C1 and C2 may be communicated over the data transmission link 1210 and 1200, respectively, and control signals C3 and C5 may be communicated over the data transmission link 1230 and 1220, respectively. Control signal C4 in table 1 (not illustrated in FIG. 1) is a control signal sent from node B 120 to node C 130 and is similarly indicative of whether node B 120 allows node C 130 to transmit data on the bus or not. Control signal C6 in table 1 (not illustrated in FIG. 1) is a control signal sent from node C 130 to node B 120 and is similarly indicative of whether node C 130 allows node B 120 to transmit data on the bus or not. The value "True" for C1, C2, C3, C4, C5 and C6, respectively, in table 1, indicates that the specific node issuing the control signal allows the respective node receiving the control signal to transmit data on the bus. The value "False" indicates that data transmission is forbidden.

Data transmissions of the respective servo nodes 140, 150 in FIG. 1 have been omitted in table 1, but a person skilled in the art realises that these servo nodes 140, 150 may transmit e.g. in time slots following after a cycle of "control command" time slots. For instance, the servo nodes 140, 150 may be arranged to receive data in time slots 1-9 in table 1 and to transmit their respective sensor values (feedback) in following time slots 10 and 11 (not illustrated in table 1), but many possibilities exist.

The compare servo command device 1120 of node A 110 and the corresponding compare servo command devices of node B 120 and node C 130 read the servo commands transmitted in the respective slot for the respective servo, along with the corresponding calculated servo commands as calculated by its own node (e.g. as calculated by the computation of servo command device 1130 for node A 110) and compare these commands with each other. If a specific command deviates, e.g. differs more than a fix or %-tual threshold level, from e.g. the mean value of the rest of the commands, then it is established that this command, along with the specific node which calculated/transmitted this command, is invalid/malfunctioning.

As an illustrative example, if said %-ual threshold level is set to 10%, and the mean value for the respective command control signal S1 and S2 is calculated continuously on a slot basis and based on data received in the last three time slots, then the compare servo commands device 1120 of node A 110

TABLE 1

| C1 | False | False | True | False | False | True | False | False | True |
|---|---|---|---|---|---|---|---|---|---|
| C2 | False | True | False | False | True | False | False | False | False |
| C3 | True | False | False | True | False | False | True | False | False |
| C4 | False | False | True | False | False | True | False | False | True |
| C5 | True | False | False | | False | False | True | False | False |
| C6 | False | True | False | False | True | False | False | False | False |
| BUS DATA | S1 = 5.0 S2 = 4.0 | S1 = 5.1 S2 = 3.9 | S1 = 5.1 S2 = 4.1 | S1 = 5.1 S2 = 4.1 | S1 = 3.3 S2 = 4.0 | S1 = 5.0 S2 = 4.0 | S1 = 5.0 S2 = 4.0 | NO TRANSMISSION | S1 = 5.1 S2 = 4.1 |
| TRANSMITTING NODE | A | B | C | A | B | C | A | B | C |
| TIME SLOT | 1 | 2 | 3 | 4 | 5 | 6 | 7 | 8 | 9 |

In table 1, time slots 1-9 represents consecutive time slots and table 1 can therefore be read as having a time line associated with it, as from left to right.

calculates this mean value to 5,05 degrees for servo 1 (S1) and 4,05 degrees for servo 2 (S2), between time slot 5-7. Node A 110 thus establishes that node B 120 is malfunctioning since it transmitted a control signal S1=3,3 degrees differing more than 10% from this calculated mean value (5,05). Node A 110 further calculates its own control signal values (S1=5,0; S2=4,0) in (or immediately before) time slot 6 and transmits these values as control commands to the bus in time slot 6.

Since the compare servo commands device 1120 of node A 110 in this way has established that node B 120 is malfunctioning, it outputs a respective "False" (binary 0) signal to AND-gate 1300. As a consequence, the output control signal C2 goes low (binary 0), represented by "False" in table 1, since the output from the NAND gate 1410 goes high only if any of the outputs from the power supply ok device 1170 and watchdog monitor device 1160 goes low. In a similar manner, also C6 goes low.

Thus, since two incoming control signals C2 and C6 in time slot 6 tell node B 120 that it is malfunctioning, its bus transmission access control device corresponding to the bus transmission access control device 1180 of node A 110, isolates the transmission switch of node B 120 (corresponding to transmission switch 1155 of node A 110), and the transmissions of node B 120 is thus blocked in time slot 8, i.e. node B 120 does not transmit any data onto the bus in time slot 8. Thus, it is evident that the invention enhances the fail silent behavior of the respective node/bus system.

Furthermore, since C1-C6 are all being functions of the relevant nodes transmission schedules so that any of C1-C6 goes low as soon as the TDMA time slot transmission schedule of its issuing node goes low (False), it is evident that the invention effectively blocks babbling idiot transmissions of the respective node/bus system. This is further illustrated in FIG. 2. FIG. 2 illustrates how node A 110 is being blocked from becoming a babbling idiot node. As is evident from FIG. 2, since control signals C3, C5 . . . CN all go low except in the time slot allocated to node A 110, the switch 1155 of node A 110 is always in its isolating condition except during time slots allocated to node A 110. As a consequence, no "babbling idiot" transmissions can be transferred onto the bus 105.

Even though a realisation according to FIG. 1 has been described above wherein the transmission switch is controlled by inter alia 2 external control signals and 1 internal (time schedule of the node itself) control signal, and wherein the switch is blocked (i.e. put in an isolating condition) when both of said external control signals are "False", it is evident that the invention provides a possibility for a wide range of other electronic "majority decisions" for controlling node transmissions, i.e. the switch arrangement of FIG. 1 could be configured to isolate only if 3 or more out of e.g. 4 or more external control signals go low (False). Furthermore, the bus transmission access control device 1180 in FIG. 1 may be realised/configured so as to allow transmissions on the bus even in case of a malfunctioning TDMA transmit schedule device 1110, e.g. by simply not letting the TDMA transmit schedule device 1110 be connected with the bus transmission access control device 1180, and many possibilities exist.

Furthermore, a control node may be connected with a sensor via an analogous interface being separated from the data bus and wherein the control node is being arranged to read sample values from the sensor over said analogous interface. This may be realised by arranging a conventional communication link, via a dedicated data port of the node's CPU, between the node 110 and a sensor/servo node. This solution may be advantageous in environments/applications where a sensor node is distant from, and not necessarily need to communicate over the bus with, other control nodes but need to communicate with at least one control node. In this way, the sensor node as such needs no babbling idiot protection, which decreases complexity/cost.

Furthermore, the above described logic may be realised by means of any suitable combination of hardware/software and the invention is not restricted the illustrative examples which have been described above.

The principles of the present invention have been described in the foregoing by examples of embodiments or modes/examples of operations, i.e. in the case of a real time flight control system. However, as already stated, the invention is applicable for any data bus node or fault tolerant (TDMA) data bus system. Therefore, the invention should not be construed as being limited to the particular embodiments/working examples discussed above, and it should be appreciated that variations/combinations may be made in those embodiments/working examples by persons skilled in the art, without departing from the scope of the present invention as defined by the appended claims.

The invention claimed is:

1. A data bus node, being a control node or a sensor node and being arranged to communicate over a TDMA data bus, the data bus node comprising:
   a time signal processing device being configured to define a TDMA time slot transmission schedule for at least said data bus node,
   a switch being configured to either connect or isolate a transmission path of said data bus node to the bus and configured to be controlled by said TDMA time slot transmission schedule for said data bus node via a bus transmission access control device,
   at least one external data transmission link that is physically separated from said bus, wherein said bus transmission access control device is configured to be further controlled by at least one control signal originating external to said data bus node via said at least one external data transmission link, and
   a logical device configured to:
      receive and process at least two input control signals from a plurality of nodes associated with the bus via said external data transmission link/s, and
      issue a control signal, being a function of said received at least two input control signals, to the bus transmission access control device.

2. The data bus node according to claim 1, wherein the bus transmission access control device comprises a voter and said logical device comprises a voter.

3. The data bus node according to claim 1, further comprising
   a watchdog monitoring device for establishing whether the data bus node itself is malfunctioning or not and wherein said bus transmission access control device is configured to be further controlled by the watchdog monitor device.

4. The data bus node according to claim 1, further comprising:
   a power supply ok device for establishing whether the data bus node itself is being powered in an accurate way and wherein said bus transmission access control device is configured to be further controlled by the power supply ok device.

5. The data bus node according to claim 1, wherein said TDMA time slot transmission schedule further defines transmission slots for at least one other node associated with the bus, and the data bus node itself is being arranged to:
   form an output control signal being a function of said TDMA time slot transmission schedule, and
   to output said control signal to at least one other node over an external data transmission link being physically separated from said bus.

6. The data bus node according to claim 5, further comprising:
   a monitoring device for monitoring control signals transmitted over the bus by other control nodes or sensor data transmitted over the bus by sensor nodes associated with the bus, and wherein the monitoring device is being arranged to:
establish a malfunctioning state of a malfunctioning node associated with the bus, based on said monitoring, and,
issue a transmission block control signal for blocking further transmissions of the malfunctioning node in response to the thus established malfunctioning state of the malfunctioning node,
and wherein the data bus node is further configured to form said output control signal as a function of said transmission block control signal.

7. The data bus node according to claim 5, further comprising:
a watchdog monitoring device for establishing whether the data bus node itself is malfunctioning or not and wherein the data bus node is configured to form said output control signal as a function of a watchdog monitor output control signal issued by said watchdog monitoring device and indicative of whether the data bus node is malfunctioning or not.

8. The data bus node according to claim 5, further comprising:
a power supply ok device for establishing whether the data bus node itself is being powered in an accurate way and wherein the data bus node is configured to form said output control signal as a function of a control signal from said power supply ok device.

9. The data bus node according to claim 1, wherein the control signal is different from data being transmitted on the bus.

10. A fault tolerant data bus system, comprising:
at least two bus nodes, being control- or sensor nodes and being arranged to communicate over a TDMA-bus, wherein a plurality of said bus nodes each comprises a bus guardian mechanism to suppress a faulty transmission behavior, wherein said at least two bus nodes each comprise
a time signal processing device being configured to define a TDMA time slot transmission schedule for at least said data bus node,
a switch being configured to either connect or isolate a transmission path of said data bus node to the bus and configured to be controlled by said TDMA time slot transmission schedule for said data bus node via a bus transmission access control device, and
at least one transmission link operatively connecting at least two of the bus nodes, wherein the data transmission link is physically separate from said bus, thereby permitting at least one bus guardian mechanism of one of the connected nodes to issue a control signal to the bus guardian mechanism of another of the connected nodes over said transmission link,
wherein said bus transmission access control device is configured to be further controlled by at least one control signal originating external to said data bus node via at least one external data transmission link being physically separated from said bus.

11. The fault tolerant data bus system according to claim 10, wherein at least three of said bus nodes are mutually interconnected with each other via data transmission links being physically separated from said bus, thereby creating a cluster of at least three nodes mutually controlling each others bus guardian mechanism via said data transmission links.

12. The fault tolerant data bus system according to claim 10, wherein a control node is connected with a sensor via an analogous interface being separated from the data bus and wherein the control node is being arranged to read sample values from the sensor over said analogous interface.

13. The fault tolerant data bus system according to claim 11, wherein said external data transmission links are physically separated from the bus comprise:
an electrical circuit,
a radio communication link,
an infrared communication link,
a sonar data transmission link,
or combinations thereof.

14. The fault tolerant data bus system according to claim 13, wherein said electrical circuit comprises a cable, wire or a lead line made of an electrically conducting material.

15. The fault tolerant data bus system according to claim 13, wherein said radio communication link comprises a wireless Bluetooth™ link.

16. An aircraft, comprising:
at least two data bus nodes each comprising
a time signal processing device being configured to define a TDMA time slot transmission schedule for at least said data bus node,
a switch being configured to either connect or isolate a transmission path of said data bus node to the bus and configured to be controlled by said TDMA time slot transmission schedule for said data bus node via a bus transmission access control device, and
at least one transmission link operatively connecting at least two of the bus nodes, wherein the data transmission link is physically separate from said bus, thereby permitting at least one bus guardian mechanism of one of the connected nodes to issue a control signal to the bus guardian mechanism of another of the connected nodes over said transmission link,
wherein said bus transmission access control device is configured to be further controlled by at least one control signal originating external to said data bus node via at least one external data transmission link being physically separated from said bus.

17. An aircraft, comprising:
a fault tolerant data system comprising at least two bus nodes, being control- or sensor nodes and being arranged to communicate over a TDMA-bus, wherein a plurality of said bus nodes each comprises a bus guardian mechanism to suppress a faulty transmission behavior, wherein said system comprises a node comprising
a time signal processing device being configured to define a TDMA time slot transmission schedule for at least said data bus node,
a switch being configured to either connect or isolate a transmission path of said data bus node to the bus and configured to be controlled by said TDMA time slot transmission schedule for said data bus node via a bus transmission access control device, and
at least one transmission link operatively connecting at least two of the bus nodes, wherein the data transmission link is physically separate from said bus, thereby permitting at least one bus guardian mechanism of one of the connected nodes to issue a control signal to the bus guardian mechanism of another of the connected nodes over said transmission link,
wherein said bus transmission access control device is configured to be further controlled by at least one control signal originating external to said data bus node via at least one external data transmission link being physically separated from said bus.

* * * * *